US012638810B2

(12) United States Patent
Christan et al.

(10) Patent No.: US 12,638,810 B2
(45) Date of Patent: May 26, 2026

(54) BRAKE SPRING FOR SUPPORTING ARBOR OF A DISPLAY, HOROLOGICAL MOVEMENT COMPRISING SAID BRAKE SPRING AND METHOD FOR INSTALLING SAID BRAKE SPRING

(71) Applicant: ETA SA Manufacture Horlogère Suisse, Grenchen (CH)

(72) Inventors: Julien Christan, Bienne (CH); Fabrice Delevaux, Les Bois (CH); Mark Postmus, Pieterlen (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 987 days.

(21) Appl. No.: 17/863,664

(22) Filed: Jul. 13, 2022

(65) Prior Publication Data

US 2023/0098943 A1 Mar. 30, 2023

(30) Foreign Application Priority Data

Sep. 29, 2021 (EP) .................................... 21199688

(51) Int. Cl.
*G04B 1/16* (2006.01)

(52) U.S. Cl.
CPC .................................... *G04B 1/16* (2013.01)

(58) Field of Classification Search
CPC ........ G04B 1/16; G04B 35/00; G04B 13/021; G04B 31/00; G04B 29/04; G04B 31/02
USPC .......................................................... 368/322
See application file for complete search history.

(56) References Cited

U.S. PATENT DOCUMENTS

2016/0026154 A1* 1/2016 Courvoisier ......... G04B 13/022 368/184
2017/0336761 A1* 11/2017 Lenoir .................. G04B 31/04
2018/0307183 A1* 10/2018 Villar .................. G04B 13/023
2019/0332057 A1* 10/2019 Born .................... G04B 43/002
2020/0319595 A1 10/2020 Villar et al.

FOREIGN PATENT DOCUMENTS

CH 700 811 B1 10/2010
CN 107390494 A 11/2017
CN 108475040 A 8/2018
(Continued)

OTHER PUBLICATIONS

Combined Chinese Office Action and Search Report issued Aug. 13, 2025 in Chinese Patnet Application No. 202211199211.3, 6 pages.
(Continued)

*Primary Examiner* — Regis J Betsch
*Assistant Examiner* — Kevin Andrew Johnston
(74) *Attorney, Agent, or Firm* — Oblon, McClelland, Maier & Neustadt, L.L.P.

(57) ABSTRACT

A brake spring intended to apply a radial force against a supporting arbor of a display of a watch, including an elastic strip, an elastic casing organ adapted to be fastened to an attachment organ of a structure of a horological movement, and a retaining element of the elastic strip configured to cooperate with the elastic strip, so as to hold it in a first position, the elastic strip being capable of being released from the retaining element so as to occupy a second position under the effect of an elastic return force, wherein it is capable of applying a resulting radial force against the arbor.

16 Claims, 2 Drawing Sheets

(56) References Cited

FOREIGN PATENT DOCUMENTS

| | | | | | |
|---|---|---|---|---|---|
| CN | 218957032 | U | | 5/2023 | |
| EP | 2 977 829 | A1 | | 1/2016 | |
| EP | 2977833 | A1 | * | 1/2016 | ............ G04B 29/02 |
| EP | 3 719 583 | A1 | | 10/2020 | |
| JP | 2006-242793 | A | | 9/2006 | |

OTHER PUBLICATIONS

European Search Report issued Feb. 21, 2022 in European Application 21199688.9 filed on Sep. 29, 2021, 3 pages (with English Translation of Categories of Cited Documents).

* cited by examiner

BRAKE SPRING FOR SUPPORTING ARBOR OF A DISPLAY, HOROLOGICAL MOVEMENT COMPRISING SAID BRAKE SPRING AND METHOD FOR INSTALLING SAID BRAKE SPRING

CROSS-REFERENCE TO RELATED APPLICATION

This application claims priority to European Patent Application No. 21199688.9 filed on Sep. 29, 2021, the entire disclosure of which is hereby incorporated herein by reference.

TECHNICAL FIELD OF THE INVENTION

The invention falls within the field of horology, and in particular relates to a brake spring for a supporting arbor of a display, horological movement comprising said brake spring and method for installing said brake spring.

TECHNOLOGICAL BACKGROUND

In an analogue display watch, the information relating to the current time is indicated by displays, such as hands, discs, or other indicator organs. Displays may also indicate other types of information, such as a power reserve, a date, etc.

So as not to damage the horological movement, or affect the accuracy of the information that it delivers, the displays must not come into contact with an obstacle during their travel. Such an obstacle may be formed, for example, by the crystal, the dial, another display or a component of the horological movement.

A plurality of factors may give rise to such a situation, such as the clearance of the arbor that supports the displays, the inclination of said arbor due to the location of the holes made in a plate or a bridge in which it is engaged, the plays in the pivots that guide said arbor, the flatness and perpendicularity tolerances of the displays driven on said arbor, etc.

Solutions have been developed for many years to guarantee a suitable positioning of the supporting arbor of displays in order to prevent the aforementioned drawbacks.

In particular, a known solution involves arranging a metal foil spring on the supporting arbor of displays in order to generate a friction torque for controlling the position of said arbor. However, the intensity of the friction torque is complex to control, insofar as it depends on the thickness of said metal foil spring, its curvature or also intrinsic features of the material that constitutes it, and directly influences the efficiency of the horological movement.

In addition to the position of the supporting arbor, its movement should be controlled in order to prevent floating of the display due to the angular plays of the gears driving the supporting arbor.

SUMMARY OF THE INVENTION

The invention resolves the aforementioned drawbacks by proposing a solution for controlling the position of a supporting arbor of a display in order to prevent any collision of said display with an obstacle.

More particularly, controlling the position of the supporting arbor of a display means controlling the position of the inclination of said arbor and the position in all directions.

Another objective of the invention is to provide a brake spring the installation of which within a horological movement is easy.

To this end, the present invention relates to a brake spring intended to apply a radial force against a supporting arbor of a display of a watch. The brake spring includes an elastic strip, an elastic casing organ adapted to be fastened to an attachment organ of a structure of a horological movement, and a retaining element of the elastic strip configured to cooperate with said elastic strip, so as to hold it in a first position, said elastic strip being capable of being released from said retaining element so as to occupy a second position under the effect of an elastic return force, wherein it is capable of applying a resulting radial force against a supporting arbor of a display.

Thanks to these features, the brake spring applies on the supporting arbor of a display a braking torque that is controlled, so as to avoid the floating of the display and to guarantee a suitable positioning of the display to prevent any contact with an obstacle, while minimising the decrease in efficiency of the horological movement.

Advantageously, the brake spring may be easily fastened to the horological movement, thanks to the elastic casing organ and to the retaining element of the elastic strip.

In particular embodiments, the invention may further include one or more of the following features, taken alone or according to any technically possible combinations.

In particular embodiments, the elastic casing organ includes jaws formed by two portions defining a bed and each extending between a first end by which said portions are connected and form a back of the bed, and a second end by which they form an opening of said bed.

In particular embodiments, at least one of the portions is configured so that the bed includes a narrow portion at its opening, adapted to receive the attachment organ in abutment so as to fasten said brake spring to the structure of a horological movement.

In particular embodiments, the opening is flared.

In particular embodiments, the elastic strip extends from the first end of one of the portions of the jaws and opposite the opening of the jaws.

In particular embodiments, the elastic strip comprises a proximal portion by which it is connected to the jaws, a distal portion, by which it cooperates with the retaining element when it occupies the first position, and by which it is intended to apply a radial load against the supporting arbor of a display when it occupies the second position, the proximal and distal portions being connected to one another by an intermediate portion extending opposite the opening.

In particular embodiments, the elastic strip and the retaining element are arranged on either side of the jaws, respectively on each of the portions of the latter.

In particular embodiments, the retaining element is formed by a hook configured to cooperate with the free end of the elastic strip.

According to another aspect, the present invention relates to a horological movement including a brake spring such as described above, and a structure comprising an attachment organ with which the elastic casing organ cooperates so as to fasten the brake spring to said structure without degree of freedom at least when the elastic strip occupies the second position.

In particular embodiments, the structure comprises a through-hole arranged to open opposite the elastic strip when it occupies the first position.

In particular embodiments, the attachment organ is formed by two protruding parts extending perpendicularly in relation to a plane formed by the structure.

In particular embodiments, the protruding parts each include, at their free end, a radial flange arranged opposite the brake spring.

In particular embodiments, one of the protruding parts is arranged in abutment against the portions of the jaws, at the narrow portion, the other protruding part being arranged in abutment against the back of the bed.

Yet another aspect of the invention relates to a method for installing a brake spring as described above on a structure of a horological movement as described above, including the following successive steps of:

- fastening the brake spring on the structure of the horological movement;
- holding the elastic strip in a first position, wherein said elastic strip is arranged so as to cooperate with the retaining element;
- engaging the arbor through an opening of the structure;
- releasing the elastic strip from the retaining element so that said elastic strip occupies a second position wherein it applies a radial force against a supporting arbor of a display of the horological movement.

In particular implementations, the fastening step includes a positioning operation wherein the brake spring is arranged against the structure of the horological movement and a casing operation wherein the brake spring is moved against said structure so that the elastic casing organ cooperates by elastic casing with the attachment organ.

In particular implementations, the release step is performed by inserting a tool through a through-hole made in the structure of the horological movement, opening opposite the elastic strip, in order that said tool exerts a load on said strip tending to move it apart from the retaining element.

BRIEF DESCRIPTION OF THE FIGURES

Other features and advantages of the invention will become apparent upon reading the following detailed description given by way of non-limiting example, with reference to the appended drawings wherein.

DETAILED DESCRIPTION OF THE INVENTION

Figure 1:
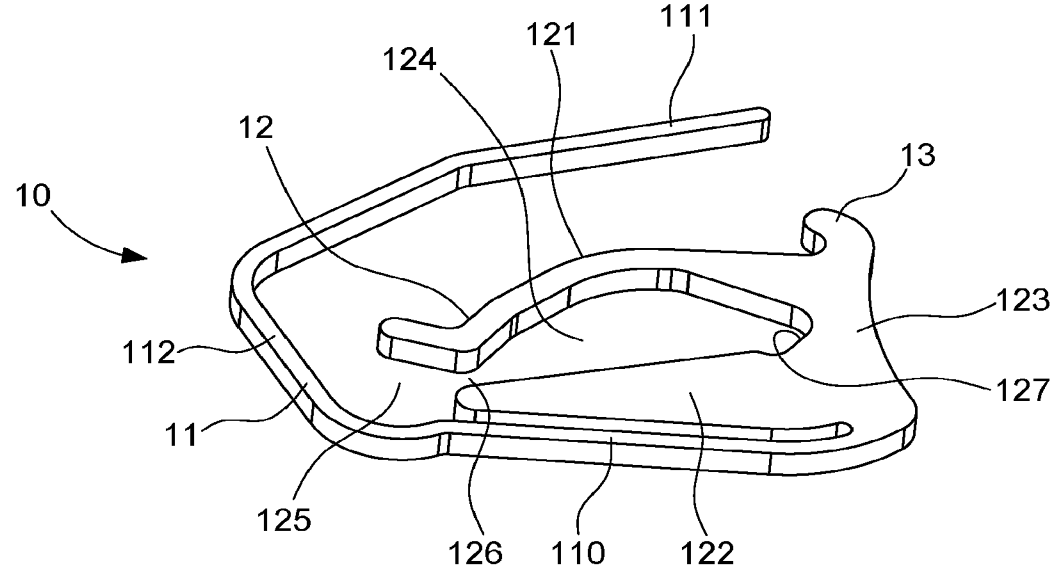
FIG. 1 shows a perspective view of a brake spring according to a preferred embodiment of the invention.

FIG. 1 shows a preferred embodiment of a brake spring 10 according to the invention, intended to be fastened to a structure 21 of a horological movement 20 so as to apply a radial force against a supporting arbor 22 of a display of a watch. Such a display may consist of a hand, a disc, or other indicator organs.

Such a structure 21 may be formed by a bridge, by a retaining plate or by a plate of the horological movement 20. The structure 21 includes an opening through which the arbor 22 is engaged, in a manner known per se by the person skilled in the art.

The brake spring 10 includes an elastic strip 11 connected to an elastic casing organ 12 adapted to be fastened to an attachment organ 23 of the structure 21 of the horological movement 20.

Figure 3:
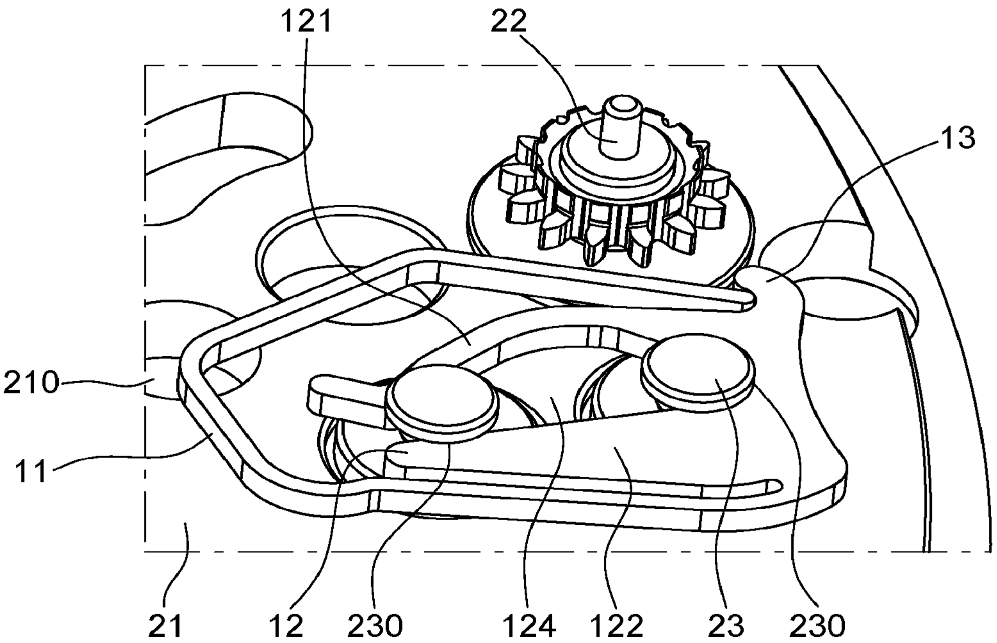

The elastic strip 11 is configured to cooperate, by a free end, with a retaining element 13 connected to the elastic casing organ 12, so as to hold said elastic strip 11 in a first position, as can be seen in FIG. 3. In this first position the elastic strip 11 is constrained by the retaining element 13, so that its freedom of movement is low, or even zero.

When the elastic strip 11 is in this first position, it is possible to install the brake spring 10 with no risk of conflict between the arbor 22 and the elastic strip 11.

The elastic strip 11 may be released from said retaining element 13, as described below in detail, so as to occupy, under the effect of an elastic return force, a second position that can be seen in FIG. 4, wherein it is capable of applying a radial force against an arbor 22. This radial force results from the elastic return force of the elastic strip 11 and generates frictions causing a braking torque of the supporting arbor 22 of the display, in a manner well known as such by the person skilled in the art.

As shown in FIGS. 1 to 4, the elastic casing organ 12 includes jaws formed by two portions 121 and 122 each extending between a first end by which said portions 121 and 122 are connected to one another and form a back 123 of a bed 124, and a second end by which they form an opening 125 of said bed 124. The bed 124 is defined between the portions 121 and 122 of the jaws and is intended to receive the attachment organ 23 after its insertion through the opening 125.

The jaws have a capacity to elastically deform insofar as the portions 121 and 122 have a degree of rotational mobility in relation to one another so as to vary the dimension of the opening 125 of the bed 124, that is to say the distance separating the second ends of said two portions 121 and 122. Such an elastic capacity makes it possible to fasten the brake spring 10 on the structure 21 of the horological movement 20, by elastic casing, as described below.

The opening 125 of the bed 124 may advantageously be flared, so as to facilitate the insertion of the attachment organ 23 through said opening 125.

Figure 2:
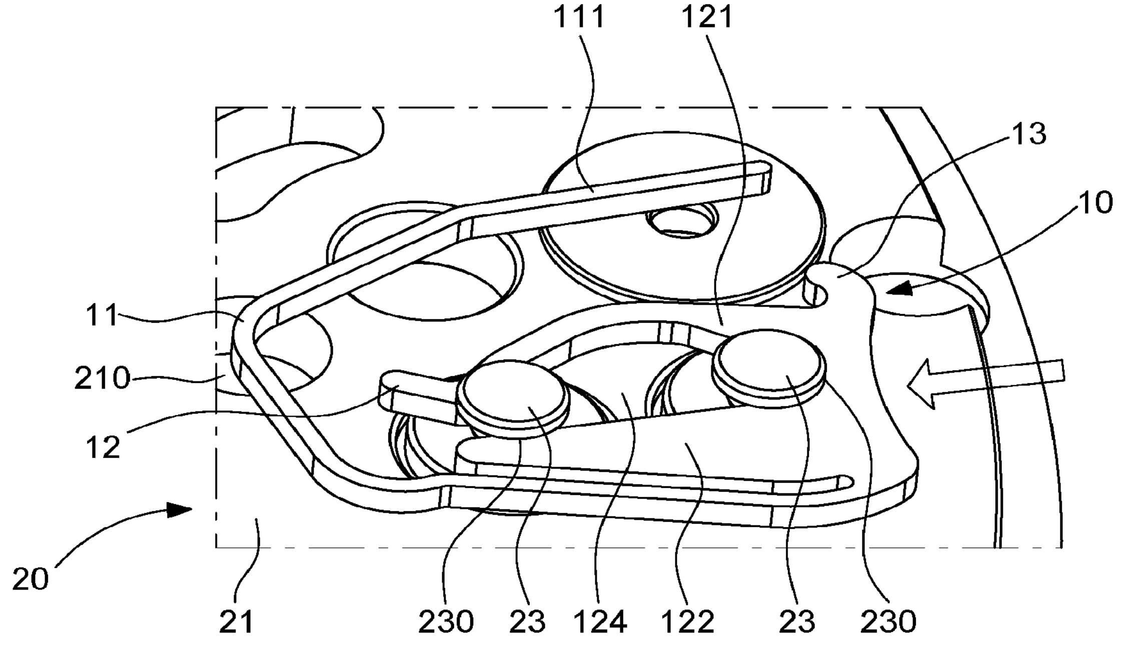
FIGS. 2 to 4 show a perspective view of the brake spring of FIG. 1 at various steps of installing the brake spring on a structure of a horological movement.
Figure 4:
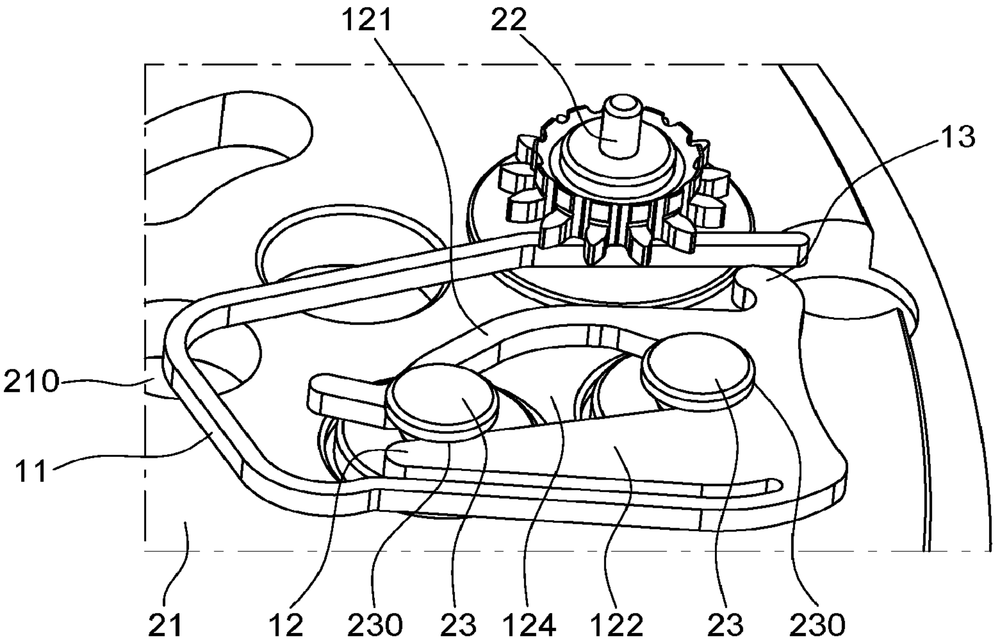

Moreover, at least one of the portions 121 or 122 may be configured so that the bed 124 includes a narrow portion 126, between the opening 125 and the back 123, adapted to receive the attachment organ 23 in abutment when the jaws are fastened to said attachment organ 23, as shown in FIGS. 2 to 4. "Narrow portion" means a portion of the bed 124 wherein the distance separating the portions 121 and 122 is reduced, as shown in FIGS. 1 to 4.

Thus, in the preferred embodiment of the invention, the portions 121 and 122 of the jaws are configured so that, from the back 123 to the opening 125, the distance that separates them increases to a maximum, then decreases to a minimum corresponding to the narrow portion 126, then increases again.

It should be noted that, due to these features, in the preferred example of embodiment shown in FIGS. 1 to 4, the bed 124 extends substantially along a longitudinal axis.

It should also be noted that, in other embodiments of the invention, the shape of the bed 124 defined by the jaws may be different from that described above.

Advantageously, the bed 124 may include a recess 127, at the back 123, in order to fit the attachment organ 23. More particularly, the shape of the recess 127 may correspond to that of a portion of the periphery of the attachment organ 23, so that the recess 127 contours the periphery of the attachment organ 23 to guarantee its holding in position in the jaws.

When the brake spring 10 is fastened to the structure 21 of the horological movement 20, the attachment organ 23 is then in abutment against the back 123, or against the recess 127, and against the narrow portion 126 of the bed 124, as can be seen in FIGS. 2 to 4.

Thus, when the jaws cooperate by elastic casing with the attachment organ 23, the brake spring 10 is linked to the structure 21 of the horological movement 20 without degrees of freedom.

Advantageously, thanks to the particular profile of the jaws, the cooperation by elastic casing is reversible, so that it is possible to remove the brake spring 10 from the structure 21 of the horological movement 20, for example to perform a maintenance operation of said horological movement 20.

In the preferred embodiment of the invention, such as shown in FIGS. 1 to 4, the attachment organ 23 is formed by two protruding parts extending perpendicularly in relation to a plane formed by the structure 21.

Such protruding parts may be formed by posts or pins.

The protruding parts each include, at their free end, a radial flange 230 arranged opposite each of the portions 121 and 122 of the jaws when the brake spring 10 is fastened on said structure 21. This flange 230 advantageously makes it possible to ensure the locking of any translational mobility of the brake spring 10 along an axis perpendicular to the plane formed by the structure 21, apart from the mechanical plays. Thus, the flanges 230 make it possible to prevent the brake spring 10 from becoming separated from the protruding parts during a possible shock of the watch.

This feature contributes to ensuring the holding in position of the brake spring 10 on the horological movement 20.

The elastic strip 11 and the retaining element 13 are preferably arranged on either side of the elastic casing organ 12, as shown in FIGS. 1 to 4 in a preferred example of embodiment of the present invention.

The elastic strip 11 extends from the first end of one of the portions 122 of the jaws and opposite the opening 125 of the bed 124 of the jaws, as can be seen in FIGS. 1 to 4.

More specifically, in the preferred embodiment of the invention, the elastic strip 11 includes a proximal portion 110 by which it is connected to the jaws and a distal portion 111, by which it cooperates with the retaining element 13 when it occupies the first position, and by which it is intended to apply a radial load against the supporting arbor 22 of the display when it occupies the second position. The proximal 110 and distal portions 111 are connected to one another by an intermediate portion 112 extending opposite the opening 125.

The proximal 110, intermediate 112 and distal portions 111 are bent one in relation to the others so that the distal 111 and proximal portions 110 are substantially parallel to one another when the elastic strip 11 is in the first position.

Thanks to this particular shape of the elastic strip 11, the force applied against the arbor 22 has a main component the direction of which is perpendicular to the longitudinal axis according to which the bed 124 of the jaws extends, and coincides substantially with the first end of the portions 121 and 122, which contributes to guaranteeing the correct strength for fastening the jaws on the structure 21.

The retaining element 13 is preferably formed by a hook configured to cooperate with the free end of the elastic strip 11. Therefore, it is understood that the hook extends from the first end of the portions 121, opposite the proximal portion 110 of the elastic strip 11.

The structure 21 advantageously comprises a through-hole 210, for example of oblong shape, arranged to open opposite the elastic strip 11 when it is in the first position. Such a layout makes it possible to be able to exert a load on the elastic strip 11 tending to disengage it from the hook with a tool engaged through said hole 210, as described in more detail below.

The present invention also relates, according to another aspect, to a method for installing the brake spring 10 on the structure 21 of the horological movement 20, successively including the steps of:

- fastening the brake spring 10 on the structure 21 of the horological movement 20; this step is performed by cooperation by elastic casing of the jaws and of the protruding parts by making said brake spring 10 slide against the structure 21 in the direction of the arrow shown in FIG. 2;
- holding the elastic strip 11 in a first position wherein said elastic strip 11 is arranged so as to cooperate with the retaining element 13;
- engaging the arbor 22 through an opening of the structure 21;
- these steps of holding the elastic strip 11 and of engaging the arbor 22 are illustrated in FIG. 3;
- releasing the elastic strip 11 from the strain exerted by the retaining element 13, so that said elastic strip 11, under the effect of an elastic return force, occupies the second position wherein it applies a radial force against the arbor 22, as shown in FIG. 4.

More specifically, the fastening step includes a positioning operation in which the brake spring 10 is arranged against the structure 21 of the horological movement 20, as shown in FIG. 2, one of the protruding parts being arranged in the bed 124 formed by the jaws and the other being arranged between the intermediate portion 112 of the elastic strip 11 and the opening 125 of the bed 124 of the jaws.

The fastening step subsequently includes a casing operation in which the brake spring 10 is translationally moved along the longitudinal axis of the bed 124 so that one of the protruding parts is arranged against the back 123 of the bed 124 and the other is arranged against the narrow portion 126 thereof.

The release step is performed by inserting a tool through the through-hole 210 made in the structure 21 of the horological movement 20, and by exerting with said tool a load on the elastic strip 11 tending to disengage it from the retaining element 13.

The brake spring 10 may be produced by any suitable manufacturing method, such as by machining, by moulding or by additive manufacturing.

Advantageously, the brake spring 10 is preferably produced by the LIGA (German for "Röntgenlithographie, Galvanoformung, Abformung" meaning "lithography, galvanisation, forming") method.

More generally, it should be noted that the implementations and embodiments considered above have been described by way of non-limiting examples, and other variants are consequently possible.

In particular, the arrangement of the elastic strip 11 in relation to the elastic casing organ 12 may be different from that described above and shown in FIGS. 1 to 4.

The invention claimed is:

1. A brake spring intended to apply a radial force against a supporting arbor of a display of a watch, comprising:

- an elastic strip;
- an elastic casing organ adapted to be fastened to an attachment organ of a structure of a horological movement; and
- a retaining element configured to cooperate with said elastic strip, so as to hold the elastic strip in a first position, wherein said elastic strip is configured to be released from said retaining element so as to occupy a second position under the effect of an elastic return force, and wherein said elastic strip is configured to apply a resulting radial force against the supporting arbor of a display.

2. The brake spring according to claim 1, wherein the elastic casing organ includes jaws formed by two portions defining a bed and each jaw extends between a first end by which said portions are connected and form a back of the bed, and a second end by which the jaws form an opening of said bed.

3. The brake spring according to claim 2, wherein at least one of the portions is configured so that the bed includes a narrow portion at its opening, adapted to receive the attachment organ in abutment so as to fasten said brake spring to the structure of a horological movement.

4. The brake spring according to claim 2, wherein the opening is flared.

5. The brake spring according to claim 2, wherein the elastic strip extends from the first end of one of the portions of the jaws and opposite the opening of the jaws.

6. The brake spring according to claim 5, wherein the elastic strip comprises a proximal portion by which said elastic strip is connected to the jaws, a distal portion, by which said elastic strip cooperates with the retaining element when said elastic strip occupies the first position, and by which said elastic strip is intended to apply a radial load against the supporting arbor when said elastic strip occupies the second position, the proximal and distal portions being connected to one another by an intermediate portion extending opposite the opening.

7. The brake spring according to claim 5, wherein the elastic strip and the retaining element are arranged on either side of the jaws.

8. The brake spring according to claim 1, wherein the retaining element is formed by a hook configured to cooperate with the free end of the elastic strip.

9. A horological movement comprising a brake spring according to claim 1, wherein the elastic casing organ cooperates so as to fasten the brake spring to said structure without a degree of freedom at least when the elastic strip occupies the second position.

10. The borological movement according to claim 9, wherein the structure comprises a through-hole arranged to open opposite the elastic strip when said elastic strip occupies the first position.

11. The borological movement according to claim 9, wherein the attachment organ includes, at its free end, a radial flange arranged opposite the brake spring.

12. The borological movement according to claim 9, wherein the attachment organ is formed by two protruding parts extending perpendicularly in relation to a plane formed by the structure.

13. The horological movement according to claim 9, wherein one of the protruding parts is arranged in abutment against the portions of the jaws, at the narrow portion, the other protruding part being arranged in abutment against the back of the bed.

14. A method for installing a brake spring according to claim 1 wherein said method includes the following successive steps of:

fastening the brake spring on the structure of the horological movement;

holding the elastic strip in the first position, wherein said elastic strip is arranged so as to cooperate with the retaining element;

engaging the supporting arbor through an opening of the structure;

releasing the elastic strip from the retaining element so that said elastic strip occupies the second position wherein said elastic strip applies the radial force against the supporting arbor of the display of the horological movement.

15. The method according to claim 14, wherein the fastening step includes a positioning operation wherein the brake spring is arranged against the structure of the horological movement and a casing operation wherein the brake spring is moved against said structure so that the elastic casing organ cooperates by elastic casing with the attachment organ.

16. The method according to claim 14, wherein the release step is performed by inserting a tool through a through-hole made in the structure of the horological movement, opening opposite the elastic strip, in order that said tool exerts a load on said strip tending to move it apart from the retaining element.

* * * * *